United States Patent Office 3,130,036
Patented Apr. 21, 1964

3,130,036
PROCESS FOR PREPARING FLAKES OF SODIUM METABORATE AND MIXTURES THEREOF
John T. Young, Long Beach, and Paul F. Jacobs, Orange, Calif., assignors to United States Borax & Chemical Corporation, Los Angeles, Calif., a corporation of Nevada
No Drawing. Filed Feb. 1, 1961, Ser. No. 86,336
4 Claims. (Cl. 71—2.4)

The present invention relates to a new and improved process for the preparation of sodium metaborate and has further reference to the application of this process for the preparation of sodium metaborate-sodium chlorate herbicide compositions.

It is, therefore, the principal object of this invention to provide a new and improved process for the preparation of sodium metaborate.

It is a further object of the present invention to provide a new and improved process for the preparation of sodium metaborate-sodium chlorate compositions in a stable and commercially desirable form.

Still further it is an object of this invention to provide an improved process for the preparation of organic-inorganic herbicidal compositions.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method for preparing solid flakes of sodium metaborate containing less than 4 moles of water of hydration, which comprises dry mixing borax and sodium hydroxide in a molar ratio of about 1:2 until reaction is initiated, immediately placing the partially reacted admixture on a drum dryer heated to at least the melting point of said admixture, whereby substantially simultaneously the reaction of the admixture goes to completion and solidified flakes of sodium metaborate are formed, and removing the flakes of said sodium metaborate from the drum dryer.

As can be seen from the foregoing broadly stated paragraph, the present process involves the dry reaction of sodium hydroxide and borax. Those skilled in the art recognize borax as being sodium tetraborate decahydrate, however, in the present specification and claims the term borax is used to designate any of the hydrated forms of sodium tetraborate. Thus it is the full intention of the present disclosure to include in the definition of borax, sodium tetraborate having for example two, four, five, eight or ten molecules of water of hydration. In the preferred embodiment of our invention we use the pentahydrate or decahydrate of sodium tetraborate. It will be understood, that by dry reaction it is meant no free water is added to the reaction mass and the only water involved is the water of hydration of the borax. The reaction is self-initiating, the sodium hydroxide when dry mixed with borax removes the water of hydration from the borax and begins to dissolve, at which time the ingredients begin to react. The initiation of the reaction is readily discernible since it is strongly exothermic.

It is of the utmost importance to note that once the reaction has been initiated, the admixture is quickly placed on a drum dryer where substantially simultaneously the admixture is melted, the reaction goes to completion and the sodium metaborate is solidified. The finished product is recovered as solid flakes containing less than 4 moles of water of hydration in an extremely short time. The use of the drum dryer thus provides an extremely rapid method for completing the reaction between the borax and sodium hydroxide, the removal of excess water and solidification of the product, which resultant product is stable in a desirable form and does not cake on standing.

Additionally the present process is well suited to continuous operation wherein the ingredients are admixed and continuously passed to an automatic feeder which continuously supplies the admixture to the drum dryer at a predetermined rate.

The stability of a hydrated compound, such as produced in the present invention, is a measure of its ability to remain at a constant water content when exposed to normal atmospheric conditions. Sodium metaborate produced by the present process retains its original water content when stored in sacks or large storage bins for substantially indefinite periods of time. Products such as sodium metaborate octahydrate, on the other hand, although seemingly dry in appearance, lose water when exposed to the atmosphere. A water migration such as this creates many handling problems since it is a major cause of caking.

The known prior art processes comprise mixing borax sodium hydroxide and added free water, and the resultant products always contain four or more moles of water of hydration, which product, as noted above, severely cakes on standing. Further, the prior art methods are all batch type processes and present extremely difficult manufacturing problems. The ingredients when first admixed form a liquid slurry, however, in a matter of a few seconds a very sticky viscous mass forms which becomes thicker and more sticky as the reaction continues. This thick viscous mass presents many difficult problems with manufacturing equipment. It is also interesting to note that the prior art methods have had to avoid heating and have even found it necessary to use cooling means on their reaction kettle. This use of cooling means is another factor which prevents the prior methods from producing a product having less than four moles of water of hydration. Additionally, the prior art processes have always resulted in a solid product which had to be comminuted or the product was produced in finely divided crystalline form. The present invention provides a method which for the first time results in a product which is in the form of readily water soluble flakes, which contain less than four moles of water of hydration and which does not cake on standing.

The present invention also provides a process for the direct preparation of solid cocrystallized sodium metaborate-sodium chlorate compositions which do not segregate on standing. Sodium chlorate is a desirable material for herbicide compositions since it provides a rapid killing action; however, when applied by itself, whether in solution or as a solid, when it becomes relatively dry and in contact with organic matter it prsesents an extreme fire hazard. To reduce the fire danger to a safe level, sodium chlorate herbicide compositions, therefore, must contain an active fire retardant.

The oxygen bearing borates in addition to being excellent herbicides are also well-known fire retardants. Thus the borates in combination with the chlorates result in non-hazardous herbicidal compositions which have a quick killing action due to the chlorates and a prolonged killing action due to the borates. The borates and sodium chlorate being of different densities tend to separate on standing and localized high concentrations of the sodium chlorate present a fire hazard. However, by using the present process, as noted above, a cocrystallized product is obtained which does not segregate on standing. The proportions of the metaborate and chlorate used in the herbicidal compositions may be varied depending largely on the amount of fire protection and length of herbicidal activity desired. Compositions containing from about 15% to about 60% sodium chlorate and from about 85% to about 40% sodium metaborate comprise excellent water soluble herbicides which present no fire hazards and which can stand substantially indefinitely without caking.

The sodium metaborate-sodium chlorate compositions are prepared substantially in the same manner as described in the preparation of the metaborate alone. Borax and sodium hydroxide are placed in a solids mixer in about a 1:2 molar ratio. To this is added the desired amount of sodium chlorate and the three ingredients are dry mixed until the reaction between the borax and sodium hydroxide is initiated. Once the reaction is initiated the admixture is quickly placed on a drum dryer where it melts and the sodium metaborate and sodium chlorate are cocrystallized as the reaction mass solidifies and the product is recovered as solid flakes of sodium chlorate-sodium metaborate.

In addition to the preparation of metaborate-chlorate compositions the present process is also ideally suited for preparing compositions containing other ingredients. For example the present process can be used to prepare organic-inorganic herbicidal compositions, organic-inorganic pesticidal compositions and organic-inorganic fungicidal compositions, wherein the ingredients do not separate and which do not cake on standing. These organic materials can be added to the metaborate alone or can be added to the metaborate-chlorate combinations. In producing compositions containing organic materials in combination with the metaborate-chlorate, the organic material should be added to the reaction vessel after the sodium chlorate has been thoroughly admixed with the sodium metaborate. This method of adding the organic constituent after the chlorate is well admixed with the borate is done to prevent any possible violent reaction between the chlorate and the organic material. The rest of the process can then be carried out in the manner previously described for the preparation of the metaborate-chlorate compositions. In this case where organic constituents are used, the drum dryer can be heated to a temperature of from about 80° C. to a temperature just below the decomposition temperature of the particular organic constituent.

Illustrative and typical compositions to which the method of the present invention is applicable may be made up of one or more ingredients chosen from each of the following groups. These organic components are preferably used in amounts of from about 1 to about 18 parts by weight with from about 99 to about 82 parts by weight of inorganic constituent. The proportion of inorganic constituent used, is the same whether metaborate is used alone or in combination with the chlorate.

(1) Herbicides:
 2,4-dichlorophenoxyacetic acid
 2,4,5-trichlorophenoxyacetic acid
 2-methyl-4-chlorophenoxyacetic acid
 Trichlorobenzoic acid
 Tribromoacetic acid
 3-p-chlorophenyl-1,1-dimethylurea
 Phenyldimethylurea
 4-(2,4-dichlorobenzoyl)phenyl α,α-dichloropropionate
 N,N-dibutylactamide laurate
 Tetrachlorohydroquinone bis-(α,α-dichloropropionate)

(2) Insecticides:
 1,1,1-trichloro-2,2-bis-(p-chlorophenyl)ethane
 1,2,3,4,5,6-hexachlorocyclohexane
 2,3,4,5,6,7,8,8-octachloro-4,7-methano-3α,4,7α-tetrahydroindane (3) Fungicides:
 Tetrachloro-p-benzoquinone
 Hydroxymercuichlorophenol
 Ethyl mercuric chloride
 Methyl mercuric dicyandiamide The sodium chlorate-sodium metaborate herbicide compositions alone or in combination with the various organic materials are stable and retain their original water of hydration over extended storage periods. Field tests have proven that the flaked form of the material is extremely satisfactory, since in this form these compositions are readily applied to the soil with common solid herbicide spreaders, and are very soluble in cold water so that solutions containing high concentrations of the ingredients can be used when liquid application is desired.

Sodium metaborate can be prepared by the present process at any temperature of from about 80° C., the melting point of the admixture of borax and sodium hydroxide, to about 960° C., the melting point of anhydrous sodium metaborate. The temperature range for the preparation of the sodium chlorate-sodium metaborate compositions is from about 80° C., the melting point of the admixture, to about 270° C. the temperature at which sodium chlorate would begin to decompose. In the preferred embodiment of our invention, for the preparation of either the sodium metaborate or the sodium chlorate-sodium metborate combination, we use drum dryer temperatures of from about 125° C. to about 220° C.

So that the present invention can be more clearly understood, the following examples are given for illustrative purposes:

I

A feed formulation consisting of 57 pounds of borax ($Na_2B_4O_7 \cdot 10H_2O$) and 12.2 pounds of sodium hydroxide, at molar ratio of about 1:2, were placed in a tumble mixer and agitated together for about one-half hour at which time the temperature of the admixture began to rise. The admixture was then fed to a drum dryer having a surface area of about one square foot, rotating at 4 r.p.m., and heated with steam at a temperature of about 158° C. The feed rate at these conditions was about 23 pounds per hour with a production of about 15 pounds per hour of finished product. Chemical analysis of the solid flakes of product yielded the following data:

Percent $Na_2O$=35.7%
Percent $B_2O_3$=40.0%
Percent $H_2O$=24.3% corresponding to sodium metaborate having the formula $$Na_2B_2O_4 \cdot 2.35H_2O$$

II

Example I was repeated except that the feed formulation contained 20 pounds of sodium chlorate in addition to the borax and sodium hydroxide. Chemical analysis of the solid flakes of product yielded the following data:

$Na_2O$=25%
$B_2O_3$=28%
$H_2O$=17%
$NaClO_3$=30% corresponding to a sodium chlorate-sodium metaborate composition having the formula:

$$Na_2B_2O_4 \cdot 2.35H_2O \cdot 0.7NaClO_3$$

III

Example I was repeated except that the temperature of the drum dryer was lowered to about 135° C. Chemical analysis of the solid flakes of product yielded the following data:

$$Na_2O = 32.0\%$$
$$B_2O_3 = 35.9\%$$
$$H_2O = 32.1\%$$

corresponding to sodium metaborate having the formula:

$$Na_2B_2O_4 \cdot 3.45H_2O$$

IV

Example I was repeated except that the temperature of the drum was increased to about 175° C. and the rotational speed of the rolls was increased to 6 r.p.m. which resulted in a production rate of about 23 pounds of finished product per hour. Chemical analysis of the final product yielded the following data:

$$Na_2O = 33.6\%$$
$$B_2O_3 = 37.6\%$$
$$H_2O = 29.8\%$$

corresponding to sodium metaborate having the formula:

$$Na_2B_2O_4 \cdot 3H_2O$$

V

A feed formulation consisting of 53 pounds of borax, 11.6 pounds of sodium hydroxide and 18.0 pounds of sodium chlorate were placed in a tumble mixer and agitated together for about one-half hour, at which time the temperature of the admixture began to increase. The admixture was then fed to a drum dryer having a surface area of one square foot, rotating at 3.5 r.p.m. and heated to about 150° C. The product was recovered at a rate of about 13.5 pounds per hour. Chemical analysis of the final product yielded the following data:

$$Na_2O = 26.2\%$$
$$B_2O_3 = 29.6\%$$
$$H_2O = 17.9\%$$
$$NaClO_3 = 26.3\%$$

corresponding to a sodium chlorate-sodium metaborate composition having the formula:

$$Na_2B_2O_4 \cdot 2.35H_2O \cdot 0.60NaClO_3$$

VI

Example V was repeated except that the rotational speed of the drums was lowered to 2.8 r.p.m. and the production rate was lowered to about 11 pounds per hour in an attempt to provide a composition with a very low water content. Chemical analysis of the flakes of product yield the following data:

$$Na_2O = 28.3\%$$
$$B_2O_3 = 31.9\%$$
$$H_2O = 10.9\%$$
$$NaClO_3 = 28.9\%$$

corresponding to a sodium chlorate-sodium metaborate composition having the formula:

$$Na_2B_2O_4 \cdot 1.33H_2O \cdot 0.58NaClO_3$$

Other modes of applying the present invention may be employed, change being made as regards the details described, provided the features stated in any of the following claims or the equivalent of such be employed.

We, therefore, particularly point out and distinctly claim as our invention:

1. The method for preparing solid flakes of sodium metaborate containing less than 4 moles of water of hydration which comprises dry mixing borax and sodium hydroxide in a molar ratio of about 1:2 until the reaction between said ingredients is initiated, immediately placing the partially reacted admixture on a drum dryer heated to from about 80° C. to about 960° C., whereby substantially simultaneously the reaction of the admixture goes to completion and solidified flakes of sodium metaborate are formed and removing said flakes from the drum dryer.

2. The method for preparing solid flakes of cocrystallized sodium chlorate-sodium metaborate containing less than 4 moles of water of hydration which comprises combining borax and sodium hydroxide in a molar ratio of about 1:2, with from about 15% to about 60% of the total weight of said borax and sodium hydroxide of sodium chlorate, dry mixing said ingredients until the reaction between the borax and sodium hydroxide is initiated, immediately placing the partially reacted admixture on a drum dryer heated to from about 80° C. to about 270° C., whereby substantially simultaneously the said reaction goes to completion and solidified flakes of cocrystallized sodium chlorate-sodium metaborate are formed and removing said flakes from the drum dryer.

3. The method for preparing solid flakes of a cocrystallized sodium metaborate-organic herbicide which comprises combining borax and sodium hydroxide in a molar ratio of about 1:2 with from about 1% to about 18% of the total weight of the borax and sodium hydroxide of an organic herbicide, said organic herbicide selected from the group consisting of 2,4-dichlorophenoxyacetic acid, 2,4,5-trichlorophenoxyacetic acid, 2-methyl-4-chlorophenoxyacetic acid, trichlorobenzoic acid, tribromoacetic acid, 3-p-chlorophenyl-1,1-dimethylurea, phenyldimethylurea, 4-(2,4-dichlorobenzoyl)phenyl $\alpha,\alpha$-dichloropropionate, N,N-dibutylactamide laurate, tetrachlorohydroquinone bis-($\alpha,\alpha$-dichloropropionate), dry mixing the ingredients until the reaction between the borax and sodium hydroxide is initiated, immediately placing the partially reacted admixture on a drum dryer heated to from about 80° C. to less than the decomposition temperature of said organic ingredient, whereby substantially simultaneously the said reacton goes to completion and solidified flakes of cocrystallized organic-inorganic herbicide are formed and removing said flakes from the drum dryer.

4. The method for preparing solid flakes of a cocrystallized sodium metaborate-chlorate-organic herbicide which comprises combining borax and sodium hydroxide in a molar ratio of about 1:2 with from about 15% to about 60% of the total weight of said borax and sodium hydroxide of sodium chlorate, dry mixing the ingredients, adding from about 1% to about 18% of the total weight of the inorganic ingredients of an organic herbicide, said organic herbicide selected from the group consisting of 2,4-dichlorophenoxyacetic acid, 2,4,5-trichlorophenoxyacetic acid, 2-methyl-4-chlorophenoxyacetic acid, trichlorobenzoic acid, tribromoacetic acid, 3-p-chlorophenyl-1,1-dimethylurea, phenyldimethylurea, 4-(2,4-dichlorobenzoyl)phenyl $\alpha,\alpha$-dichloropropionate, N,N-dibutylactamide laurate, tetrachlorohydroquinone bis-($\alpha,\alpha$-dichloropropionate), continuing the dry mixing until the reaction between the borax and sodium hydroxide is initiated, immediately placing the partially reacted admixture on a drum dryer heated to a temperature of from about 80° C. to less than the decomposition temperature of said organic ingredient, whereby substantially simultaneously the said reaction goes to completion and solidified flakes of cocrystallized organic-inorganic herbicide are formed and removing said flakes from the drum dryer.

References Cited in the file of this patent

UNITED STATES PATENTS

| | | |
|---|---|---|
| 1,976,299 | Russell | Oct. 9, 1934 |
| 2,097,411 | Corkill | Oct. 26, 1937 |
| 2,685,513 | Henn et al. | Aug. 3, 1954 |
| 2,700,604 | Knight | Jan. 25, 1955 |
| 2,847,293 | Harris et al. | Aug. 12, 1958 |
| 2,886,425 | Seibert | May 12, 1959 |

OTHER REFERENCES

Mellor: Comprehensive Treatise on Inorganic and Theoretical Chemistry, Longmans, Green and Co., 1924, vol. V, p. 67.